Figure 1:
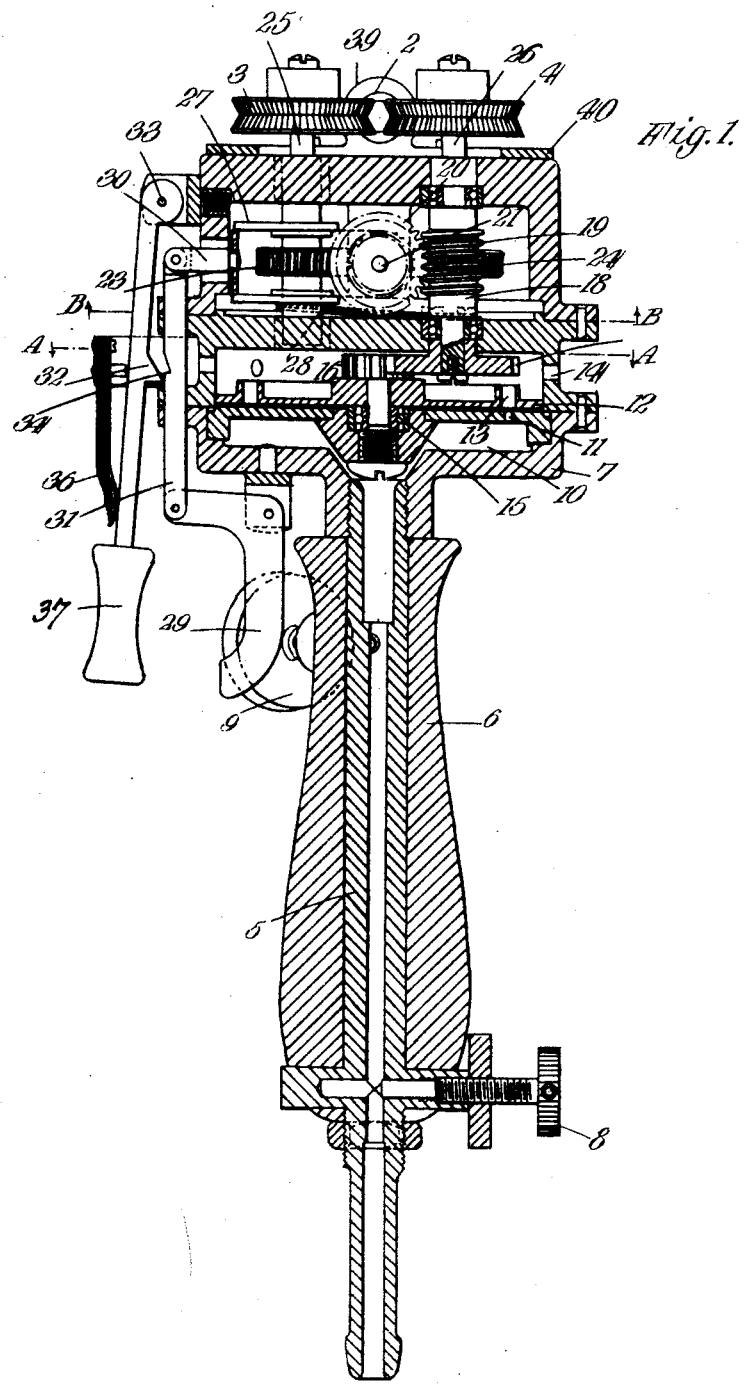

Oct. 15, 1929.  J. H. PATERSON  1,731,502
ARC WELDING TOOL
Filed Aug. 7, 1928  2 Sheets-Sheet 1

Inventor
John Hamilton Paterson
By
Pennie Davis Marvin & Edmonds
Attorneys

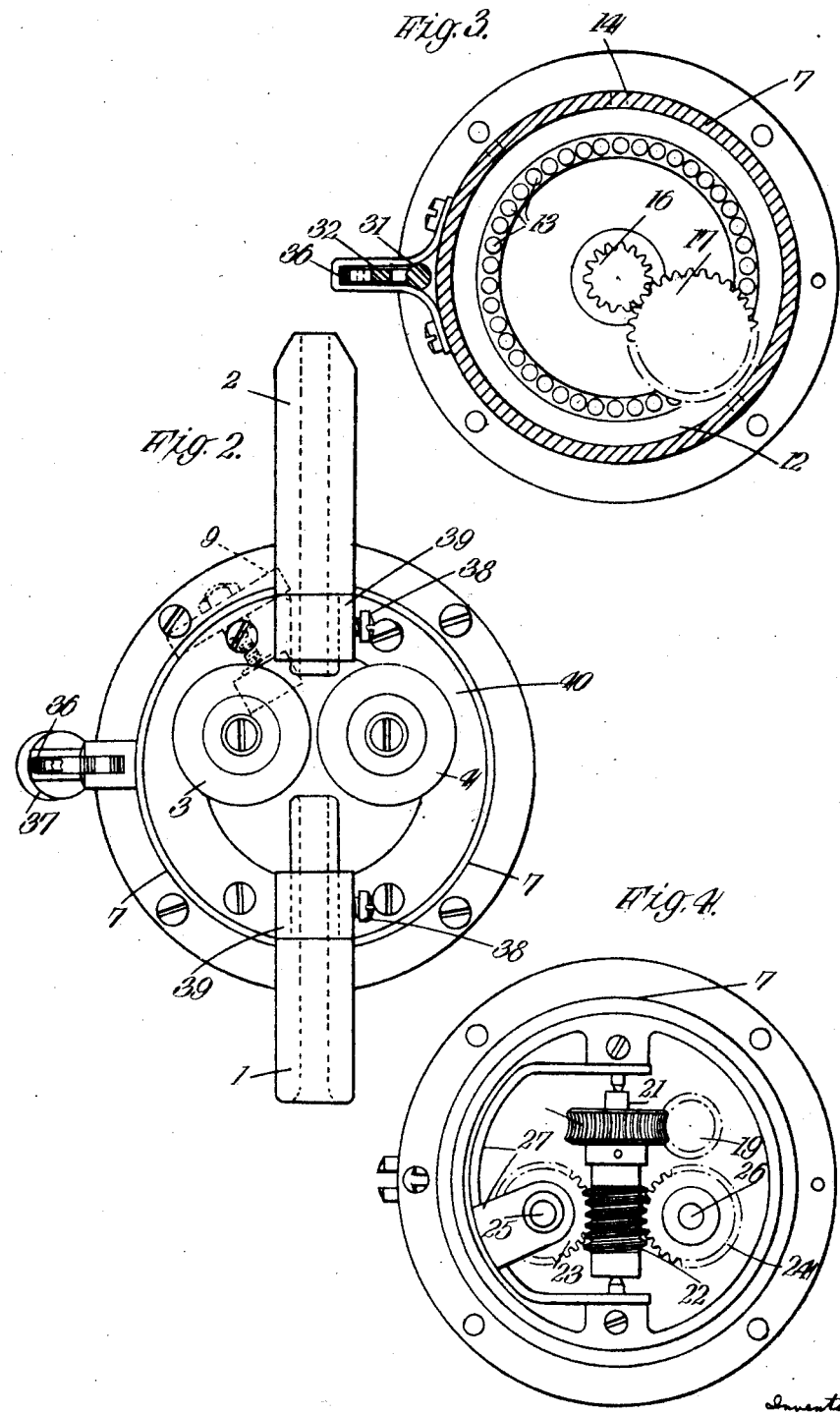

Patented Oct. 15, 1929

1,731,502

UNITED STATES PATENT OFFICE

JOHN HAMILTON PATERSON, OF WESTMINSTER, LONDON, ENGLAND, ASSIGNOR TO IMPERIAL CHEMICAL INDUSTRIES LIMITED, OF LONDON, ENGLAND, A BRITISH COMPANY

ARC-WELDING TOOL

Application filed August 7, 1928, Serial No. 297,971, and in Great Britain September 1, 1927.

This invention relates to a hand tool to be used in semi-automatic arc welding operations in which the welding electrode is guided directly by the operator, but is fed forward automatically at a regulated speed.

According to this invention the hand tool through which the electrode is fed to the work carries the feeding motor and means by which the motor can be controlled. The motor may be of any convenient type, either electrical or pneumatic, in the latter case pressure air being supplied conveniently through a tube passing through the handle of the tool and having a supply connection at the rear end of the handle. The motor is fitted to the forward end of the handle and may conveniently be of cylindrical form projecting forwardly along the handle axis.

In order that the invention may be clearly understood and readily carried into effect, it will now be described more fully with reference to the accompanying drawings, which depict, by way of example, a tool operated by air pressure and in which:—

Figures 1 and 2 illustrate the tool respectively in section and in plan view, and Figures 3 and 4 are respectively sections on the lines A—A and B—B of Figure 1.

The electrode is fed to the work through a guide 1 and nozzle 2 by means of rollers 3 and 4, either or both of which may be movable in a direction at right angles to the axis of the electrode so that, although the rollers are rotated continuously, the feed of the electrode may be started or stopped at will. Air under pressure for driving the rollers is supplied through a tube 5 located within a handle 6 to which the casing 7 of the motor and gearing is fitted, the supply being through a regulating valve 8 and a valve or cock 9 whereby the air supply may be admitted or cut off. The air is admitted to a nozzle chest 10 from which it escapes through a series of apertures 11 and impinges on a turbine disc 12 having a series of apertures 13, the air finally escaping through vents 14 in the casing 7. Either the apertures 11 or 13, or both series, is or are suitably inclined with reference to the plane of the turbine disc 12 in order that rotation may be imparted to the latter by the action of the air escaping from the apertures 11 and impinging on the walls of the apertures 13. The spindle of the turbine disc 12 is mounted in a suitable bearing 15 and is fitted with a pinion 16 adapted to engage a gear wheel 17 carried by a spindle 18, which, by means of a worm 19 and worm wheel 20, drives a transverse spindle 21. This spindle is provided with a worm 22 adapted to engage two worm wheels 23, 24, respectively mounted on spindles 25, 26 carrying the rollers 3 and 4.

In the tool illustrated the spindle 26 of the roller 4 is carried in fixed bearings, but the spindle 25 of the roller 3 is supported in a frame 27 pivoted about the axis of the spindle 21; thus, by rotation of this frame about this axis, the roller 3 may be rocked toward or away from the electrode without bringing its driving worm wheel 23 out of contact with the worm 22. Normally the roller 3 is held in contact with the electrode projecting between the rollers 3 and 4 by means of a leaf spring 28 adapted to bear on the underside of the frame 27 as seen in Figure 1. When it is desired that the feed of the electrode shall cease, however, the roller 3 may be brought out of contact with the electrode by rocking the frame 27 against the action of the spring 28. This is accomplished by means of a trigger comprising a bell-crank lever 29 connected with a lever 30 on the frame 27 by a link 31; thus, on depression of the bell-crank lever 29 by means of the thumb or finger, the frame 27 is rocked and the roller 3 brought out of contact with the electrode, the feed of which ceases accordingly. In order to avoid the necessity of maintaining pressure on the bell-crank lever 29 when cessation of the feed over a considerable period is desired, a catch 32 pivoted at 33 and adapted to engage a recess 34 in the link 31 is provided; thus, when the bell-crank lever 29 is fully depressed, the catch 32 engages the recess 34 owing to the action of a leaf spring 36, release of the trigger being effected manually by pressure of the thumb or finger on a knob or the like 37 fitted on the end of the catch 32.

The guide 1 and nozzle 2 are preferably made replaceable in order to permit the use of electrodes of various diameters. To this end they are held by such means as screws 38, in sockets 39 attached to or forming part of a ring or plate 40 fitted on the end of the casing 7. The ring or plate 40 may be insulated from the casing, but is preferably in metallic contact therewith and any suitable terminal or socket may be fitted thereto for the purpose of electrical connections to the supply circuit. In order, however, to prevent any tendency to sparking between the electrode and the rollers 3 and 4 during operation, the latter are preferably insulated from their spindles by such means as bushes of insulating material.

What I claim and desire to secure by Letters Patent of the United States is:—

1. A hand arc welding tool comprising in combination feeding rollers for an electrode, a motor for driving said feeding rollers, a frame carrying one of said rollers, a pivot for said frame, means, such as a spring bearing on said frame, whereby said last-mentioned roller may be pressed into contact with said electrode and means, such as manually operated trigger mechanism associated with said frame, whereby said last-mentioned roller may be withdrawn from contact with said electrode.

2. A hand arc welding tool comprising in combination feeding rollers for an electrode, a motor for driving said feeding rollers, a frame carrying one of said rollers, a pivot for said frame, means, such as a spring bearing on said frame, whereby said last-mentioned roller may be pressed into contact with said electrode, means, such as manually operated trigger mechanism associated with said frame, whereby said last-mentioned roller may be withdrawn from contact with said electrode and a spring catch co-operating with said trigger mechanism whereby said last-mentioned roller may be maintained out of contact with said electrode.

JOHN HAMILTON PATERSON.